Nov. 15, 1927.
V. B. JONES
VALVE
Filed July 21, 1926
1,649,235
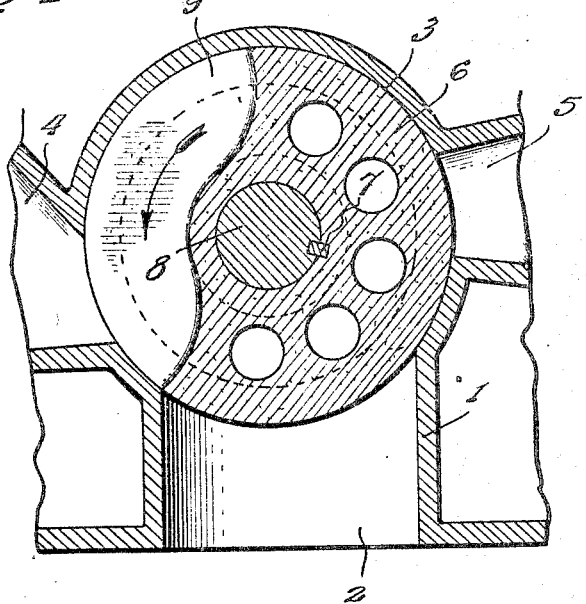
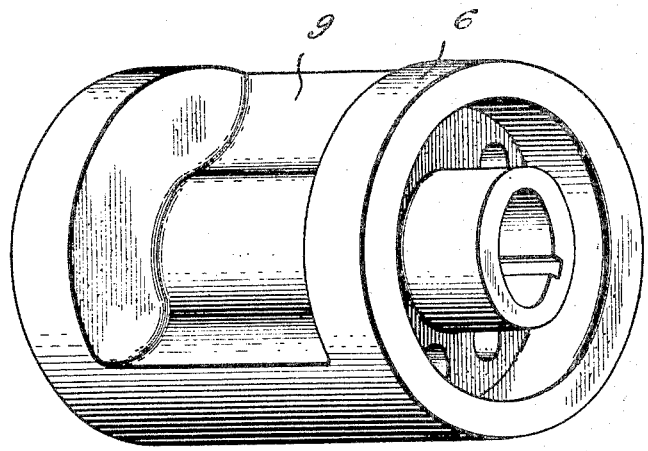
Inventor
V. B. Jones.
By Lacey & Lacey, Attorneys Patented Nov. 15, 1927.

1,649,235

UNITED STATES PATENT OFFICE.

VIRGIL B. JONES, OF HAWARDEN, IOWA.

VALVE.

Application filed July 21, 1926. Serial No. 124,009.

This invention relates to improvements in valves and while directed primarily to a novel valve body for internal combustion engines of the rotary valve type, may find embodiment in oscillatory valves or sliding valves, or valves of any type which have surfaces for frictional rubbing contact with another surface, and the primary object of the invention is to provide a valve which will be self-lubricating, and in this connection it may be stated that while valves of the self-lubricating type have been devised, they all embody some means for the supply of lubricant to the contacting parts, whereas, in accordance with the present invention, the valve body is inherently self-lubricating. Therefore, the invention contemplates the provision of a valve body which will require no lubrication but which, on the other hand, will be of a material which in itself is a lubricant.

Another object of the invention is to provide a valve body of a material the coefficients of expansion and contraction of which are much lower than that of steel, of which such bodies are ordinarily formed, so that valve sticking is entirely avoided.

In the accompanying drawing:

Figure 1 is a sectional view illustrating the invention embodied in a valve of the rotary type which is mounted in a chamber in the cylinder head of an internal combustion engine.

Figure 2 is a perspective view of the valve body.

In Figure 1, the numeral 1 indicates a portion of the cylinder head of an internal combustion engine having the passage 2 communicating with the cylinder of the engine and having, likewise, a substantially cylindrical valve chamber 3 and inlet and exhaust ports 4 and 5 located at opposite sides of the chamber and above and at opposite sides of the passage 2. The valve body is indicated by the numeral 6 and is keyed or otherwise secured, as at 7, upon a shaft 8 which is rotated to effect rotation of the valve bodies for the several cylinders of the engine which are fixed upon the shaft. The valve body is provided for a portion of its length in one side with a recess or passage 9 for the combustible and exhaust gases, this passage being designed to successively establish communication between the passage 2 and the intake and the exhaust ports 4 and 5. One objection to gas engines of the type embodying a valve arrangement such as shown in Figure 1, is that the valves, being of steel, require lubrication, and the lubricant supplied to the surface of the valves is subject to carbonization and this is, of course, detrimental to the efficiency of the engine. Another disadvantage presented by a steel rotary valve employed in an internal combustion engine is that the valve body will expand when it becomes heated, owing to the high coefficient of expansion of steel, and there is extreme likelihood of sticking of the valves if they are, as they should be, of dimensions to fit in a gas-tight manner in their respective chambers.

The valve body 6 of the present invention is made of graphite, either natural or artificial, and the valve is formed by mixing the graphite in a highly comminuted state with a suitable binder and subjecting the material to extremely high pressure in a mold of suitable form into which the material is forced. The resulting product possesses extreme hardness and density, at the same time retaining all of the lubricating properties possessed by the graphite. Therefore, it will be seen that the invention contemplates the provision of a valve body which is inherently self-lubricating or, in other words a valve body of a material having the property of lubricating the surface in contact with which it rotates or moves. Furthermore, due to the very low coefficient of expansion of the graphite, there will be no likelihood of sticking of the valve because of expansion and, therefore, this difficulty, which is inherent in steel valves, is overcome by the present invention. It is, of course, to be understood that the pressure to which the graphite mixture is subjected in molding or forming the valve body is sufficiently high to produce a body having a high degree of hardness and density but that this does not in any way detract from the lubricating quality of the graphite.

Having thus described the invention, what I claim is:

1. A valve body substantially entirely of graphite compressed to a high degree of hardness and density.

2. A valve body substantially entirely of highly compressed graphite and a binder.

3. A valve seat, and a valve body substantially entirely of graphite adapted to move across said seat.

In testimony whereof I affix my signature.

VIRGIL B. JONES. [L. S.]